Dec. 9, 1930.  C. R. ALEXANDER  1,784,410
STALK CUTTER
Filed May 7, 1929  2 Sheets-Sheet 1
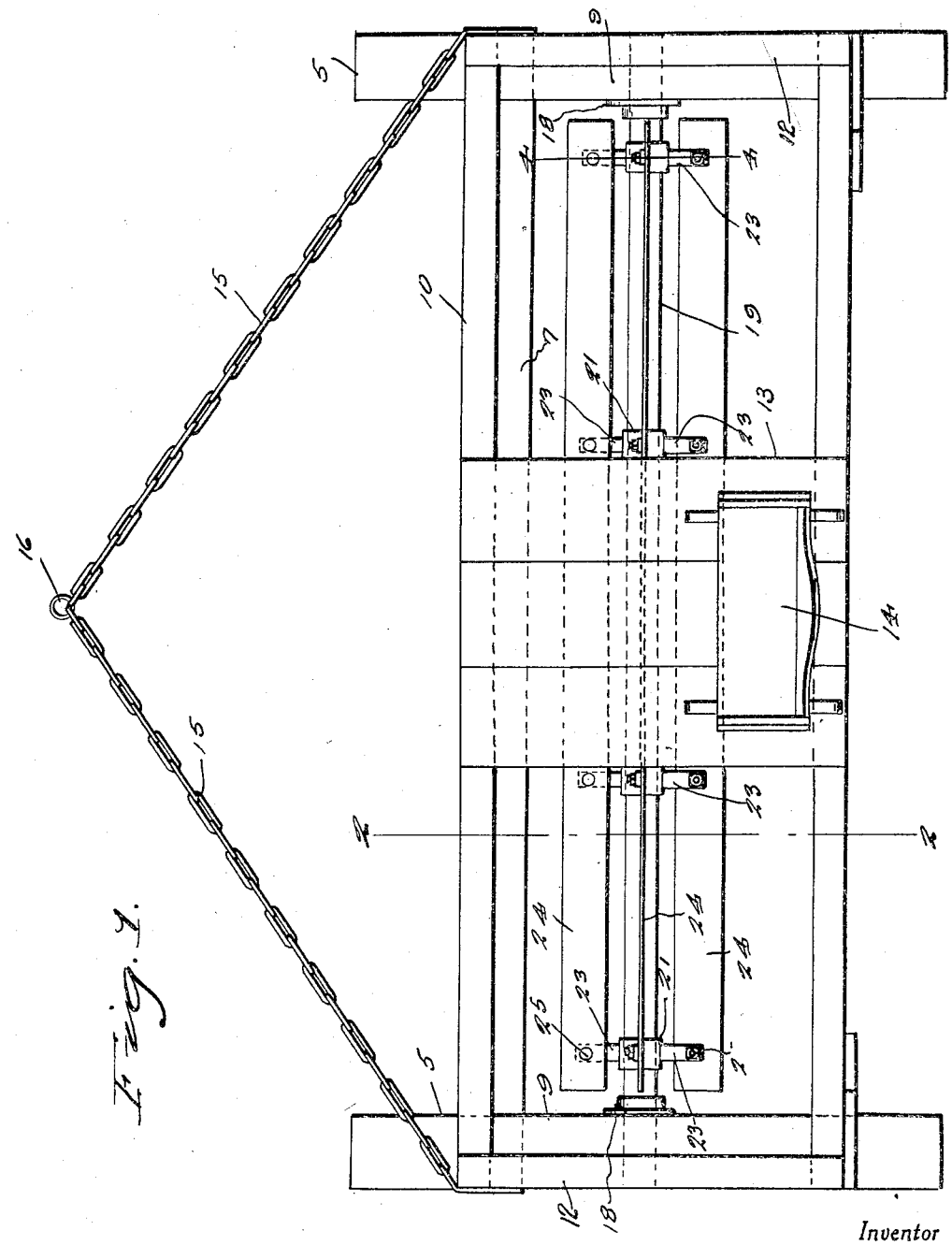
Inventor
Charles R. Alexander
By Clarence A. O'Brien
Attorney Dec. 9, 1930. C. R. ALEXANDER 1,784,410
STALK CUTTER
Filed May 7, 1929 2 Sheets-Sheet 2
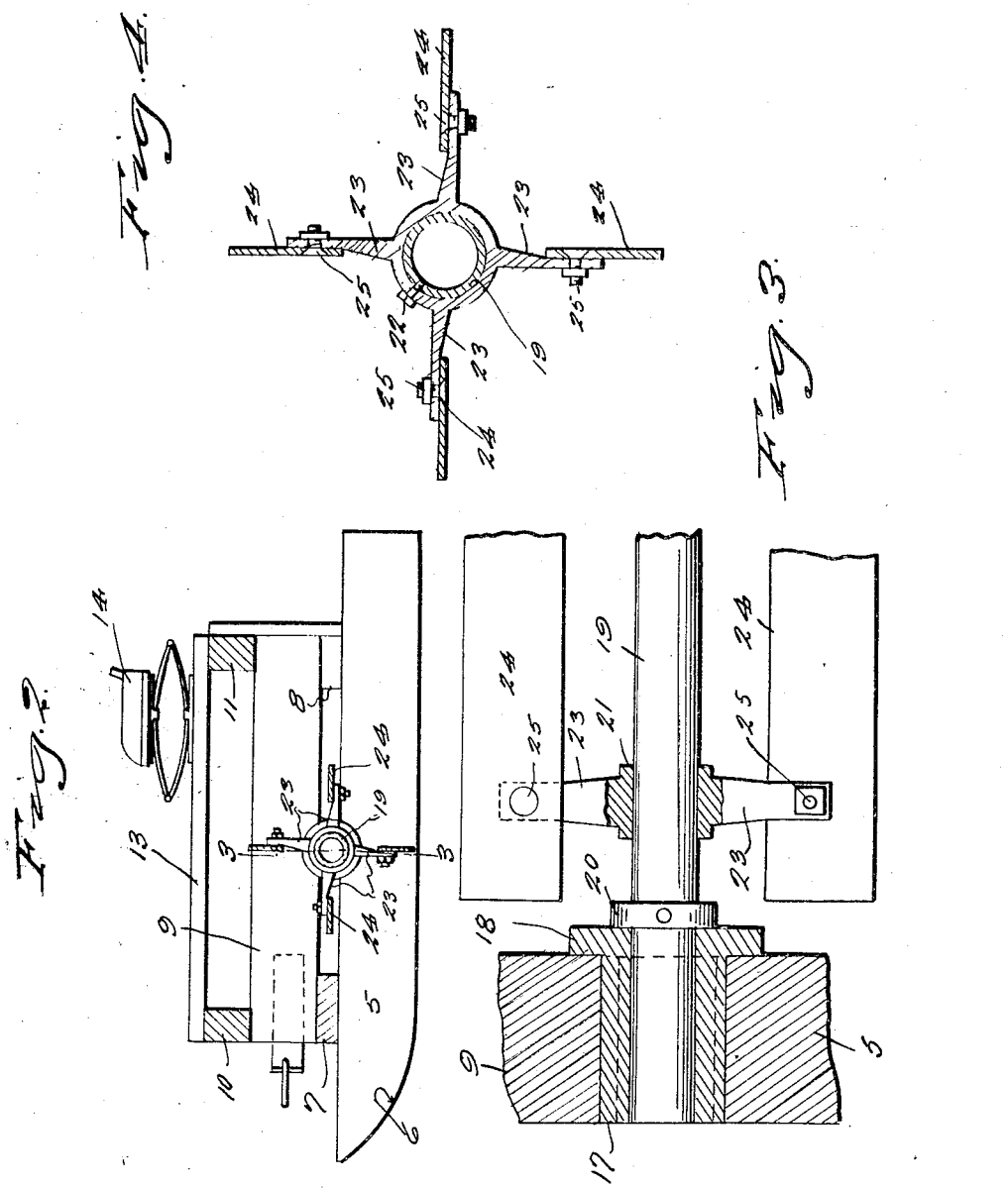
Inventor
Charles R. Alexander
By Clarence A. O'Brien
Attorney Patented Dec. 9, 1930

1,784,410

UNITED STATES PATENT OFFICE

CHARLES R. ALEXANDER, OF ENNIS, TEXAS

STALK CUTTER

Application filed May 7, 1929. Serial No. 361,069.

The present invention relates to a stalk cutter and aims to provide a device mounted in a frame on runners, said device being rotatable.

Another very important object of the invention resides in the provision of a structure of this nature which is exceedingly simple, inexpensive to manufacture, strong and durable, thoroughly efficient and reliable in use and operation and otherwise well adapted for the purposes for which it is designed.

With the above and numerous other objects in view as will appear as the description proceeds, the invention resides in certain novel features of construction and in the combination and arrangement of parts as will be hereinafter more fully described and claimed.

In the drawing:

Figure 1 is a top plan view of the apparatus embodying the features of my invention.

Figure 2 is a vertical longitudinal section taken substantially on the line 2—2 of Figure 1.

Figure 3 is an enlarged detail section, taken substantially on the line 3—3 of Figure 2, and Figure 4 is an enlarged detail section, taken substantially on the line 4—4 of Figure 1.

Referring to the drawing in detail, it will be seen that the numerals 5 denote a pair of spaced parallel co-extensive runners, the forward ends of which are upwardly and forwardly bevelled as is indicated at 6. A cross bar 7 is mounted on the forward portions of the runners 5. Blocks 8 are mounted on the rear portions thereof. Side bars 9 are mounted on the cross bars 7 and the blocks 8, one above each runner 5. A front cross bar 10 and a rear cross bar 11, extend across the front and rear ends of the side bars 9. Longitudinal connecting bars 12 are engaged with the ends of the bars 10 and 11, one above each side 9. A platform 13 is mounted on the central portions of the bars 10 and 11 and supports a spring mounted seat 14. Means 15 are fixed to the front end of the side 9 and converge forwardly toward each other and are connected with a ring 16, to which suitable draft means may be engaged for pulling the apparatus along the ground.

Bearings 17 are mounted between the upper edges of the runners 5 and the lower edges of the sides 9 and their inner ends are provided with annular outwardly directed flanges 18. A shaft 19 has the standard journaled in the bearing 17 and stop collars 20 are fixed to the shaft immediately adjacent the flanges 18. A plurality of hubs 21 are mounted on the shaft 19 in spaced relation and are secured to the shaft by means of the screws 22. A plurality of spokes 23 radiate from the hubs. A plurality of blades 24 are attached to the extremities of the spokes by means of bolts 25.

Thus when the apparatus is pulled along the shaft will rotate and the revolving of the blades will cut the stalks as will be apparent.

In actual practice it has been found that this apparatus is a big saving of expense in that four mules do the work of six mules. The apparatus eliminates the use of two men and one man can do the work instead of three. The apparatus is what is known as a slide cutter. The reel formed by the blades, the spokes, the hub and the shaft goes into operation when the machine is moving and is made to cut three rows at a time. With an ordinary team of four mules, one man can cut around thirty-five acres of ground. The four horse evener may be attached to the ring 16 in front of the center of the apparatus.

It is thought that the construction, utility and advantages of this construction will now be quite apparent to those skilled in this art, without a more detailed description thereof.

The present embodiment of the invention has been disclosed in considerable detail, merely for the purposes of exemplification, since in actual practice it attains the features of advantage enumerated as desirable in the statement of the invention and the above description. It will be apparent that changes in the details of construction and in the combination and arrangement of parts may be resorted to, without departing from the spirit or scope of the invention as hereinafter claimed or sacrificing any of its advantages.

What is claimed as new is:

1. In an apparatus of the class described, a pair of spaced parallel co-extensive runners, a cross bar across the forward portions of the runners, blocks on the rear portions of the runners, sides mounted on the cross bars and the blocks one above each runner, a pair of cross bars across the sides, longitudinal bars connecting the ends of the last mentioned cross bars, a platform on the last mentioned cross bars, a seat on the platform, and a rotary reel cutting structure mounted across the runners and below the sides.

2. In an apparatus of the class described, a pair of spaced parallel co-extensive runners, a cross bar across the forward portions of the runners, blocks on the rear portions of the runners, sides mounted on the cross bars and the blocks, one above each runner, a pair of cross bars across the sides, longitudinal bars connecting the ends of the last mentioned cross bars, a platform on the last mentioned cross bars, a seat on the platform, and a rotary reel cutting structure mounted across the runners and below the sides, said reel cutter structure comprising a shaft, bearings disposed between the upper edges of the runners and the lower edges of the sides, said shaft journaled in the bearings, hubs on said shaft in spaced relation to each other, spokes radiating from said hubs, and transversely extending blades bolted to the extremities of said spokes.

3. In an apparatus of the class described, a pair of spaced parallel co-extensive runners, a frame supported on said runners and including side members disposed one above each of said runners, and longitudinal cross members connecting the ends of said sides, bearings disposed between the upper edges of said runners and the lower edges of said sides, a shaft extending longitudinally of said frame and having its ends journaled in said bearings, hubs adjustable on said shafts, spokes radiating from said hub, cutter blades bolted to the extremities of said spokes.

In testimony whereof I affix my signature.

CHARLES R. ALEXANDER.